(12) United States Patent
Tang et al.

(10) Patent No.: US 11,425,703 B2
(45) Date of Patent: Aug. 23, 2022

(54) METHOD FOR TRANSMITTING SIGNAL, NETWORK DEVICE AND TERMINAL DEVICE

(71) Applicant: Guangdong OPPO Mobile Telecommunications Corp., Ltd., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 383 days.

(21) Appl. No.: 16/609,372

(22) PCT Filed: May 2, 2017

(86) PCT No.: PCT/CN2017/082767
§ 371 (c)(1),
(2) Date: Oct. 29, 2019

(87) PCT Pub. No.: WO2018/201295
PCT Pub. Date: Nov. 8, 2018

(65) Prior Publication Data
US 2020/0059911 A1   Feb. 20, 2020

(51) Int. Cl.
*H04W 48/16* (2009.01)
*H04W 72/04* (2009.01)
*H04W 88/02* (2009.01)

(52) U.S. Cl.
CPC ......... *H04W 72/042* (2013.01); *H04W 48/16* (2013.01); *H04W 72/0446* (2013.01); *H04W 88/02* (2013.01)

(58) Field of Classification Search
CPC ............... H04L 45/28; H04L 41/0654; H04L 2012/5627; H04W 72/042; H04W 48/16; H04W 72/0446; H04W 88/02
See application file for complete search history.

(56) References Cited

U.S. PATENT DOCUMENTS 11,115,257 B2 * 9/2021 Islam ............... H04L 1/1819
2010/0173637 A1 * 7/2010 Damnjanovic ....... H04L 5/0062
455/447

(Continued)

FOREIGN PATENT DOCUMENTS

CN   102202324 A   9/2011
CN   101299630 B   7/2012

(Continued)

OTHER PUBLICATIONS

Canadian Examination Report for CA Application 3062807 dated Aug. 27, 2021. (4 pages).

(Continued)

*Primary Examiner* — Hassan A Phillips
*Assistant Examiner* — Prenell P Jones
(74) *Attorney, Agent, or Firm* — Young Basile Hanlon & MacFarlane, P.C.

(57) ABSTRACT

A method for signal transmission, a network device and a terminal device are provided. The method includes: determining, by the network device, first configuration information, wherein the first configuration information is used for indicating a first time domain resource and a first time domain granularity corresponding to the first time domain resource, wherein the first time domain resource and the first time domain granularity are used for the terminal device to search for a downlink control channel on the first time domain resource by taking the first time domain granularity (Continued)

as a cycle; and transmitting, by the network device, the first configuration information to the terminal device.

17 Claims, 8 Drawing Sheets

(56) References Cited

U.S. PATENT DOCUMENTS

| | | | |
|---|---|---|---|
| 2011/0069637 | A1 | 3/2011 | Liu et al. |
| 2012/0213196 | A1* | 8/2012 | Chung .................. H04W 74/08 370/330 |
| 2014/0233537 | A1 | 8/2014 | Wu et al. |
| 2016/0095090 | A1 | 3/2016 | Xue et al. |
| 2016/0338109 | A1* | 11/2016 | Rahman .............. H04W 56/005 |
| 2017/0201899 | A1* | 7/2017 | Guan ................ H04W 72/0446 |
| 2017/0332411 | A1* | 11/2017 | Rahman ................ H04W 76/16 |
| 2018/0016728 | A1* | 1/2018 | Davis ...................... D06F 37/12 |
| 2018/0062724 | A1* | 3/2018 | Onggosanusi ....... H04B 7/0413 |
| 2018/0227887 | A1* | 8/2018 | Hakola ................. H04B 7/022 |
| 2019/0028143 | A1* | 1/2019 | Zhang ............... H04W 74/0833 |
| 2019/0159251 | A1* | 5/2019 | Li ......................... H04L 1/1896 |
| 2019/0174434 | A1* | 6/2019 | Koskinen ............. H04W 52/50 |
| 2019/0174494 | A1* | 6/2019 | Xu ...................... H04W 56/001 |
| 2019/0238287 | A1* | 8/2019 | Zhou .................... H04L 5/0035 |
| 2019/0281481 | A1 | 9/2019 | Shen |
| 2019/0281632 | A1* | 9/2019 | Sha ....................... H04W 48/10 |
| 2019/0342851 | A1* | 11/2019 | Shan ..................... H04W 60/04 |
| 2019/0387409 | A1* | 12/2019 | Thangarasa ........... H04W 16/00 |
| 2020/0068535 | A1* | 2/2020 | Wang ................... H04W 72/02 |
| 2020/0077470 | A1* | 3/2020 | Xiong ................... H04L 1/1854 |
| 2020/0367180 | A1* | 11/2020 | Osawa ................. H04W 52/365 |
| 2020/0389879 | A1* | 12/2020 | Zhang ................. H04L 5/0092 |
| 2021/0014768 | A1* | 1/2021 | Hong .................... H04W 40/22 |
| 2021/0084121 | A1* | 3/2021 | Park .................. H04W 72/0453 |
| 2021/0191494 | A1* | 6/2021 | Rotem ................. G06F 1/3296 |
| 2021/0204227 | A1* | 7/2021 | Bergljung ............. H04W 52/34 |
| 2021/0212067 | A1* | 7/2021 | Hwang ............. H04W 72/0446 |
| 2021/0298025 | A1* | 9/2021 | Wang ................ H04W 72/0493 |

FOREIGN PATENT DOCUMENTS

| | | |
|---|---|---|
| CN | 102668645 A | 9/2012 |
| CN | 103139920 A | 6/2013 |
| CN | 103181112 A | 6/2013 |
| CN | 103457710 A | 12/2013 |
| CN | 102316592 B | 6/2014 |
| CN | 106454901 A | 2/2017 |
| EP | 2894915 A1 | 7/2015 |
| EP | 3528529 A1 | 8/2019 |
| KR | 20140085378 A | 7/2014 |
| KR | 20160039639 A | 4/2016 |
| RU | 2444157 C1 | 2/2012 |
| WO | 2014047821 A1 | 4/2014 |
| WO | 2017052686 A1 | 3/2017 |

OTHER PUBLICATIONS

Korean Office Action with English Translation for KR Application 1020197031119 dated Jul. 29, 2021. (3 pages).
Canada First Office Action for CA Application 3,062,807 dated Dec. 7, 2020.
Communication pursuant to Article 94(3) EPC Examination for EP Application 17908577.4 dated Nov. 18, 2020.
Korean First Office Action with English Translation for KR Application 10-2019-7031119 dated Jan. 26, 2021.
Russia Grant Decision with English Translation for RU Applciation 2019137222/07(073597) dated Nov. 17, 2020.
3GPP TSG RAN WG1 Meeting #88; R1-1702095 Athens, Greece, Feb. 13-17, 2017.
Russia Office Action with English Translation of RU Application 2019137222/07(073597) dated Aug. 19, 2020.
European Search Report dated Dec. 5, 2019 from European Application No. 17908577.4.
EP Examination of EP Application No. 17908577.4 dated May 11, 2020.
Japanese First Office Action with English Translation for JP Application 2019-557368 dated Feb. 19, 2021. (8 pages).
India First Examination Report for IN Application 201917044240 dated Feb. 9, 2021. (6 pages).
Singapore First Written Opinion for SG Application 11201909894Q dated Apr. 13, 2021. (8 pages).
CATT, Search space design for NR-PDCCH, 3GPP TSG RAN WG1 Meeting #88bis, R1-1704573, Apr. 3-7, 2017. (3 pages).
CATT, Configurable DL control channel monitoring for power savings, 3GPP TSG RAN WG1 Meeting#88bis, R1-1704574, Apr. 3-7, 2017. (5 pages).
CATT, NR-PDCCH design for low latency communications, 3GPP TSG RAN WG1 Meeting #88bis, R1-1704575, Apr. 3-7, 2017. (3 pages).
Chinese First Office Action with English Translation for CN Application 201780090257.2 dated Apr. 29, 2022. (19 pages).

* cited by examiner

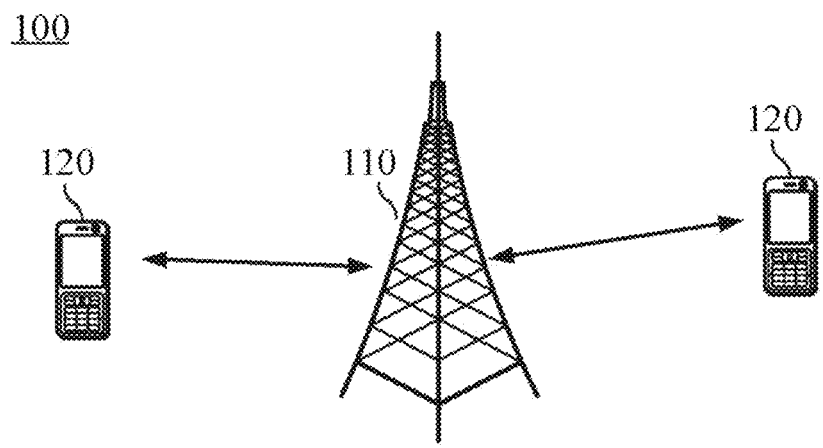

FIG. 1

```
The network device determines first configuration information, wherein
the first configuration information is used for indicating a first time
domain resource and a first time domain granularity corresponding      S210
to the first time domain resource, and the first time domain resource
and the first time domain granularity are used for a terminal device to
search for a downlink control channel on the first time domain
resource by taking the first time domain granularity as a cycle
```

```
The network device transmits the first                                 S220
configuration information to the terminal device
```

FIG. 2

METHOD FOR TRANSMITTING SIGNAL, NETWORK DEVICE AND TERMINAL DEVICE

CROSS-REFERENCE TO RELATED APPLICATION(S)

This application is a 371 application of International Application No. PCT/CN2017/082767, filed on May 2, 2017, the entire disclosure of which is hereby incorporated by reference.

TECHNICAL FIELD

The present disclosure relates to the communication field, and more particularly, to a method for signal transmission, a network device and a terminal device.

BACKGROUND

In a Long Term Evolution (LTE) system, a time domain position of the Physical Downlink Control Channel (PDCCH) is fixed and located in the first few symbols of each subframe. A terminal device can receive PDCCH by blind detection in only these symbols.

In the current research of 5G New Radio (NR) system, in order to improve the flexibility of network resource allocation or reduce the receiving delay of PDCCH, the flexibility of the time domain location of PDCCH is greatly improved, and a terminal device can be configured by a network device to search for PDCCH symbol by symbol.

In this way, the terminal device is required to carry out blind detection of PDCCH on all symbols, thus increasing the complexity and power consumption of blind detection of PDCCH by the terminal.

SUMMARY

Implementations of the present application provide a method for signal transmission, a network device and a terminal device.

In a first aspect, a signal transmission method is provided, characterized by including: determining, by a network device, first configuration information, wherein the first configuration information is used for indicating a first time domain resource and a first time domain granularity corresponding to the first time domain resource, and the first time domain resource and the first time domain granularity are used for a terminal device to search for a downlink control channel on the first time domain resource by taking the first time domain granularity as a cycle; and transmitting, by the network device, the first configuration information to the terminal device.

Optionally, the network device may determine the first configuration information according to the delay requirement of a service to be transmitted. For example, if it is not needed to transmit a service with very low delay in a future period of time, the network device may set a PDCCH search granularity greater than the first time domain granularity indicated by the first configuration information, so that the terminal device needn't search for PDCCH too frequently, thereby reducing the complexity and power consumption of searching for PDCCH by the terminal device. Alternatively, if the service to be transmitted is a low delay service, the network device may set a PDCCH search granularity less than the first time domain granularity indicated by the first configuration information, so that the frequency of searching for PDCCH by the terminal device can be increased, and further the scheduling delay of the data channel can be reduced.

In combination with the first aspect, in some implementations of the first aspect, the network device transmits first configuration information to the terminal device, including: the network device transmitting the first configuration information to the terminal device through high-layer signaling.

The high-layer signaling may be a radio resource control (RRC) signaling. That is, the network device can semi-statically configure the first configuration information for the terminal device through high-layer signaling. In this way, when the network device does not distribute other configuration information through high-layer signaling, the terminal device can continue searching for PDCCH according to the first configuration information by default, that is, searching for PDCCH on the first time domain resource by taking the first time domain granularity as a cycle.

Optionally, in the implementation of the present application, the network device may configure the first configuration information for the terminal device through Downlink Control Information (DCI), that is, the network device may dynamically configure the first configuration information for the terminal device through DCI. In this way, the network device can dynamically adjust, through DCI, the region and frequency of searching for PDCCH by the terminal device.

In combination with the first aspect, in some implementations of the first aspect, the method further includes: transmitting, by the network device, second configuration information to the terminal device, wherein the second configuration information is used for indicating a second time domain resource within the first time domain resource and a second time domain granularity corresponding to the second time domain resource, the second time domain resource and the second time domain granularity are used for the terminal device to search for a downlink control channel on the second time domain resource by taking the second time domain granularity as a cycle.

In combination with the first aspect, in some implementations of the first aspect, the network device transmits second configuration information to the terminal device, including: transmitting, by the network device, the second configuration information to the terminal device through downlink control information (DCI).

In combination with the first aspect, in some implementations of the first aspect, the first configuration information includes at least one of a starting position, an ending position, and a time domain length of the first time domain resource.

For example, the starting position of the first time domain resource may be predefined or a default value, so that the position information of the first time domain resource only needs to include at least one of the ending position or the time domain length of the first time domain resource, or the time domain length of the first time domain resource may be predefined or a default value, so that the position information of the first time domain resource includes at least one of the starting position and the ending position of the first time domain resource.

Alternatively, the position information of the first time domain resource may include at least two of a starting position, an ending position, and a time domain length of the first time domain resource, and the implementation of the present application does not limit the indication manner of the first time domain resource.

In combination with the first aspect, in some implementations of the first aspect, the starting position or ending position of the first time domain resource is indicated by one of the following: a time domain offset relative to a time domain position of a synchronization signal or broadcast channel, or a slot boundary, or a subframe boundary.

It should be noted that the above-mentioned slot boundary may be the starting boundary or ending boundary of a slot, or may be several symbols at the beginning or several symbols at the end of a slot. Similarly, the subframe boundary may be the starting boundary or ending boundary of a subframe, or may be several symbols at the beginning or several symbols at the end of a subframe, etc. The implementation of the present application does not limit the specific position of the slot boundary or subframe boundary.

In combination with the first aspect, in some implementations of the first aspect, the time domain offset is in units of at least one symbol, or a preset quantity of symbols, or a slot, or a micro-slot.

It should be understood that the units of time domain offset listed herein are merely exemplary and should not constitute any limitation to this application. This application does not exclude the possibility of new time units appearing in future standards as units of the time domain offset.

In combination with the first aspect, in some implementations of the first aspect, the first time domain granularity is in units of at least one symbol, or a preset quantity of symbols, or a slot, or a micro-slot.

It should be understood that the units of the first time domain granularity listed here are merely illustrative and should not constitute any limitation to the application. The application does not exclude the possibility of new time units appearing in future standards as units of the first time domain granularity.

In combination with the first aspect, in some implementations of the first aspect, the method further includes: determining, by the network device, a third time domain resource and a third time domain granularity corresponding to the third time domain resource according to predefined third configuration information; and transmitting, by the network device, a downlink control channel according to the third time domain resource and the third time domain granularity.

In combination with the first aspect, in some implementations of the first aspect, the third configuration information is determined according to at least one of a frequency band, a carrier, a system bandwidth, and a numerology.

That is, the third configuration information may be different according to difference of at least one of a frequency band, a carrier, a system bandwidth, and a numerology.

In a second aspect, there is provided a method of signal transmission, including: receiving, by a terminal device, first configuration information transmitted by a network device; the terminal device determining a first time domain resource and a first time domain granularity corresponding to the first time domain resource according to the first configuration information; and the terminal device searching for a downlink control channel on the first time domain resource by taking the first time domain granularity as a cycle.

In combination with the second aspect, in some implementations of the second aspect, the terminal device receives the first configuration information transmitted by the network device, including: receiving, by the terminal device, the first configuration information transmitted by the network device through high-layer signaling.

In combination with the second aspect, in some implementations of the second aspect, the method further includes: receiving, by the terminal device, second configuration information sent by the network device; determining, by the terminal device, a second time domain resource in the first time domain resource and a second time domain granularity corresponding to the second time domain resource according to the second configuration information; and searching, by the terminal device, for a downlink control channel on the second time domain resource by taking the second time domain granularity as a cycle.

In combination with the second aspect, in some implementations of the second aspect, the terminal device receives second configuration information transmitted by the network device, including: receiving, by the terminal device, the second configuration information transmitted by the network device through downlink control information (DCI).

In combination with the second aspect, in some implementations of the second aspect, the method further includes: if the terminal device does not receive the configuration information transmitted by the network device, determining, by the terminal device, a third time domain resource and a third time domain granularity corresponding to the third time domain resource according to predefined third configuration information; and searching, by the terminal device, for a downlink control channel on the third time domain resource by taking the third time domain granularity as a cycle.

In combination with the second aspect, in some implementations of the second aspect, the third configuration information is determined according to at least one of a frequency band, a carrier, a system bandwidth, and a numerology.

In combination with the second aspect, in some implementations of the second aspect, the first time domain resource is indicated by at least one of a starting position, an ending position, and a time domain length of the first time domain resource.

In combination with the second aspect, in some implementations of the second aspect, the starting position or ending position of the first time domain resource is indicated by one of the following: a time domain offset relative to a time domain position of a synchronization signal or broadcast channel, or a slot boundary, or a subframe boundary.

In combination with the second aspect, in some implementations of the second aspect, the time domain offset is in units of at least one symbol, or a preset quantity of symbols, or a slot, or a micro-slot.

In combination with the second aspect, in some implementations of the second aspect, the first time domain granularity is in units of at least one symbol, or a preset quantity of symbols, or a slot, or a micro-slot.

In a third aspect, there is provided a network device, including units for performing the method in the first aspect or various implementations thereof.

In a fourth aspect, there is provided a terminal device, including units for performing the method in the second aspect or various implementations thereof.

In a fifth aspect, a network device is provided, which includes a memory, a processor and a transceiver, and the memory is used for storing programs, the processor is used for executing the programs, and when executing the programs, the processor executes the method of the first aspect or various implementations thereof based on the transceiver.

In a sixth aspect, a terminal device is provided, which includes a memory, a processor and a transceiver, and the memory is used for storing programs, the processor is used for executing the programs, and when executing the programs, the processor executes the method of the second aspect or various implementations thereof based on the transceiver.

In a seventh aspect, a computer readable medium is provided. The computer readable medium stores program codes executable by a network device, and the program codes include instructions for executing the method in the first aspect or various implementations thereof.

In an eighth aspect, a computer readable medium is provided. The computer readable medium stores program codes executable by a terminal device, and the program codes include instructions for executing the method in the second aspect or various implementations thereof.

BRIEF DESCRIPTION OF DRAWINGS

FIG. 1 is a schematic diagram of a wireless communication system according to an implementation of the present application.

FIG. 2 is a schematic flow chart of a method for signal transmission according to an implementation of the present application.

DETAILED DESCRIPTION

Figure 3:
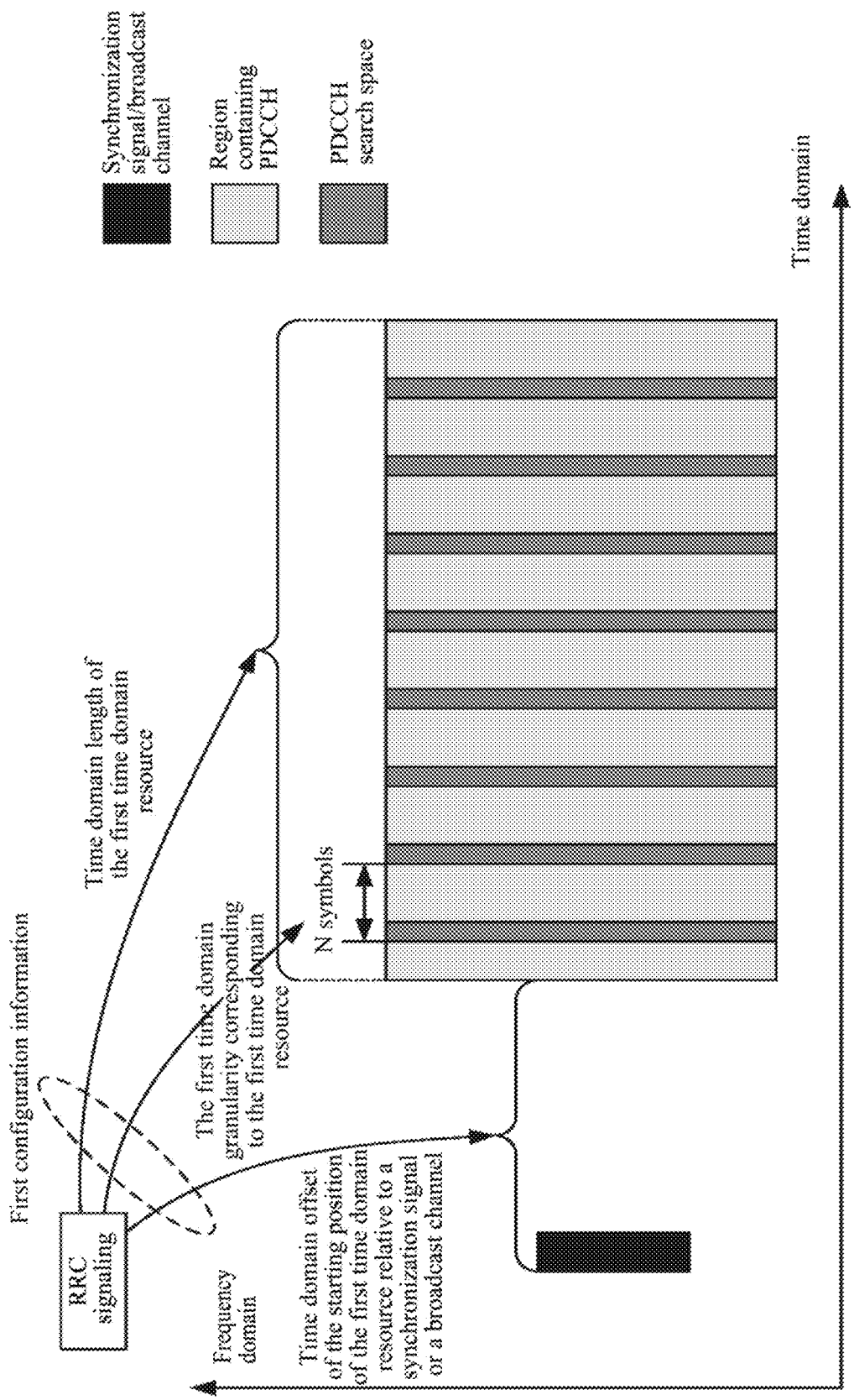
FIG. 3 is a schematic flow chart of an example of a method for signal transmission according to an implementation of the present application.

Hereinafter, technical solutions in the implementations of the present application will be described with reference to the accompanying drawings.

The technical solution of the implementations of the present application may be applied to various communication systems, such as, a Global System of Mobile communication (GSM) system, a Code Division Multiple Access (CDMA) system, a Wideband Code Division Multiple Access (WCDMA) system, a General Packet wireless Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, or a future 5G system.

FIG. 1 shows a wireless communication system 100 to which an implementation of the present application is applied. The wireless communication system 100 may include a network device 110. The network device 100 may be a device that communicates with a terminal device. The network device 100 may provide communication coverage for a specific geographical area, and may communicate with a terminal device (e.g., UE) in the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a network side device in a future 5G network, or a network device in a future evolved Public Land Mobile Network (PLMN), etc.

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

Optionally, the 5G system or network may also be referred to as a New Radio (NR) system or network.

FIG. 2 is a schematic flow chart of a method for signal transmission according to an implementation of the present application. As shown in FIG. 2, the method 200 includes the following acts.

In S210, the network device determines first configuration information, wherein the first configuration information is used for indicating a first time domain resource and a first time domain granularity corresponding to the first time domain resource, and the first time domain resource and the first time domain granularity are used for a terminal device to search for a downlink control channel on the first time domain resource by taking the first time domain granularity as a cycle.

In S220, the network device transmits the first configuration information to the terminal device.

Specifically, the network device determines first configuration information, wherein the first configuration information is used for indicating a first time domain resource and a first time domain granularity corresponding to the first time domain resource, and the network device transmits the first configuration information to a terminal device, so that the terminal device can determine the first time domain resource and the first time domain granularity corresponding to the first time domain resource according to the first configuration information, and further the terminal device can search for a downlink control channel (PDCCH) on the first time domain resource by taking the first time domain granularity as a cycle, or search for a downlink control channel every time domain length of the first time domain granularity, that is, searching for the downlink control channel by taking the first time domain granularity as an interval.

Optionally, the network device may determine the first configuration information according to the delay requirement of a service to be transmitted. For example, if it is not needed to transmit a service with very low delay in a future period of time, the network device may set a PDCCH search granularity greater than the first time domain granularity indicated by the first configuration information, so that the terminal device may not search for PDCCH too frequently, thereby reducing the complexity and power consumption of searching for PDCCH by the terminal device. Alternatively, if the service to be transmitted is a low delay service, the network device may set a PDCCH search granularity less than the first time domain granularity indicated by the first configuration information, so that the frequency of searching for PDCCH by the terminal device can be increased, and further the scheduling delay of the data channel can be reduced.

Optionally, in the implementation of the present application, the first configuration information includes the position information of the first time domain resource and information of the first time domain granularity corresponding to the first time domain resource, and the position information of the first time domain resource is used for indicating information of a region where the terminal device searches for PDCCH, and the information of the first time domain granularity is used for indicating information of a frequency of searching for PDCCH by the terminal device, that is, the time interval of searching for the PDCCH.

The position information of the first time domain resource may include at least one of a starting position, an ending position, and a time domain length of the first time domain resource.

For example, the starting position of the first time domain resource may be predefined or a default value, so that the position information of the first time domain resource only needs to include at least one of the ending position and the time domain length of the first time domain resource to determine a region where the terminal device searches for PDCCH. Alternatively, the time domain length of the first time domain resource may be predefined or a default value, so that the region where the terminal device searches for PDCCH can be determined when the position information of the first time domain resource includes at least one of the starting position and the ending position of the first time domain resource. Alternatively, the position information of the first time domain resource may also include at least two of the starting position, ending position, and time domain length of the first time domain resource, that is, the starting position and ending position, or starting position and time domain length, or ending position and time domain length of the first time domain resource may be used for indicating the first time domain resource, and the implementation of the present application does not limit the indication manner of the first time domain resource.

Optionally, in the implementation of the present application, if the position information of the first time domain resource includes the starting position or ending position of the first time domain, the starting position or ending position of the first time domain resource can be indicated by a time domain offset relative to the time domain position of a synchronization signal, or a synchronization signal block, or a broadcast channel, or a slot boundary, or a subframe boundary.

That is, the starting position of the first time domain resource may be a time domain offset relative to the time domain position of the synchronization signal, or a time domain offset relative to the time domain position of the broadcast channel, or a time domain offset relative to the boundary position of a slot, or a time domain offset relative to the boundary position of a subframe. Of course, the starting position or the ending position of the first time domain resource may be a time domain offset relative to other signals, or a time domain offset relative to the boundary position of a symbol, etc. The implementation of the present application does not limit the indication manner of the starting position and ending position of the first time domain resource.

It should be understood that the above description of the starting position or ending position of the first time domain resource is only provided as an example and is not intended to constitute any limitation to the application. The present application does not exclude the possibility that other signals may be used as reference signals of the time domain offsets of the starting position or ending position of the first time domain resource in future standards.

It should be noted that the above-mentioned slot boundary may be the starting boundary or ending boundary of a slot, or may be several symbols at the beginning or several symbols at the end of a slot. Similarly, the subframe boundary may be the starting boundary or ending boundary of a subframe, or may be several symbols at the beginning or several symbols at the end of a subframe, etc. The implementation of the present application does not limit the specific position of the slot boundary or subframe boundary.

Optionally, in the implementation of the present application, the time domain offset is in units of at least one symbol, or a preset quantity of symbols, or a slot, or a micro-slot.

It should be understood that the units of time domain offset listed herein are merely exemplary and should not constitute any limitation to this application. This application does not exclude the possibility of new time units appearing in future standards and used as units of the time domain offset.

Optionally, in the implementation of the present application, the first time domain granularity is in units of at least one symbol, or a preset quantity of symbols, or a slot, or a micro-slot.

That is, the terminal device may search for a downlink control channel at intervals of a preset quantity of symbols, or may search for a downlink control channel at intervals of a plurality of slots, or may search for a downlink control channel at intervals of a plurality of micro-slots.

It should be understood that the units of granularity in the first time domain listed here are merely illustrative and should not constitute any limitation to the application. The application does not exclude the possibility of new time units appearing in future standards and used as units of granularity in the first time domain.

In the implementation of the present application, the first configuration information is used to instruct the terminal device to search for PDCCH on the first time domain resource by taking the first time domain granularity as a cycle. Correspondingly, the network device transmits PDCCH on part or all of the resources in the first time domain resource by taking the first time domain granularity or a multiple of the first time domain granularity as a cycle. In other words, the time domain resources where the terminal device searches for PDCCH are greater than or equal to the time domain resources where the network device transmits the PDCCH, and thus it is ensured that the terminal device can find the PDCCH transmitted by the network device.

Optionally, as one implementation, S220 may further include: the network device transmits the first configuration information to the terminal device through high-layer signaling.

Specifically, the high-layer signaling may be a radio resource control (RRC) message. That is, the network device can semi-statically configure the first configuration information for the terminal device through high-layer signaling. In this way, when the network device does not distribute other configuration information through high-layer signaling, the terminal device can continue searching for PDCCH according to the first configuration information by default, that is, searching for PDCCH on the first time domain resource by taking the first time domain granularity as a cycle.

If the network device wants to modify the first configuration information configured in a semi-static manner, the network device can send the second configuration information to the terminal device through high-layer signaling, so that the terminal device can determine a second time domain resource and a second time domain granularity according to the second configuration information, and further search for the downlink control channel according to the second time domain resource and the second time domain granularity.

Optionally, in the implementation of the present application, the network device may configure the first configuration information for the terminal device through Downlink Control Information (DCI), that is, the network device may dynamically configure the first configuration information for the terminal device through DCI. In this way, the network device can dynamically adjust, through DCI, the region and frequency of searching for PDCCH by the terminal device.

For example, the network device can dynamically adjust the region and frequency of searching for PDCCH by the terminal device according to the delay requirement of the service to be transmitted. For example, if it is not needed to transmit a service with very low delay in the future, the network device may reduce the frequency of searching for PDCCH by the terminal device, for example, increasing the first time domain granularity, thereby reducing the complexity and power consumption of searching for PDCCH by the terminal device. Or, if the network device determines that it needs to transmit a low-delay service, it is required to reduce the scheduling delay of the data channel, and in this case, the network device may increase the frequency of searching for PDCCH by the terminal device, for example, reducing the first time domain granularity, thereby reducing the scheduling delay of the data channel.

Optionally, in some implementations, the method 200 may further include: the network device sends second configuration information to the terminal device, wherein the second configuration information is used for indicating a second time domain resource in the first time domain resource and a second time domain granularity corresponding to the second time domain resource, and the second time domain resource and the second time domain granularity are used for the terminal device to search for a downlink control channel on the second time domain resource by taking the second time domain granularity as a cycle.

Specifically, in a case that the terminal device is configured with the first configuration information by the network device, the terminal device can search for PDCCH according to the first configuration information, that is, in the first time domain resource, PDCCH is searched for by taking the first time domain granularity as a cycle. If the network device determines that the terminal device does not need to search for PDCCH so frequently in a future period of time, that is, the frequency of searching for PDCCH by the terminal device needs to be reduced, or if the network device determines that the terminal device needs to search for PDCCH more frequently in a future period of time, that is, the frequency of searching for PDCCH by the terminal device needs to be increased, the network device can transmit second configuration information to the terminal device. The second configuration information is used for indicating a second time domain resource in the first time domain resource and a second time domain granularity corresponding to the second time domain resource, so that the terminal device can determine the second time domain resource and the second time domain granularity according to the second configuration information, and search for PDCCH in the second time domain resource by taking the second time domain granularity as a cycle. The second time domain granularity may be greater than the first time domain granularity or less than the first time domain granularity. For example, when the network device determines that it is needed to transmit a low delay service, the network device increases the frequency of searching for PDCCH by the terminal device. In this case, the second time domain granularity indicated by the second configuration information may be less than the first time domain granularity.

Optionally, the second time domain resource is a time domain resource within the first time domain resource, that is, the second time domain resource includes part of time domain resource of the first time domain resource. The terminal device searches for PDCCH on the second time domain resource by using a second time domain granularity, and on other time domain resources other than the second time domain resource on the first time domain resource, PDCCH can still be searched for according to the first time domain granularity.

Optionally, as an implementation, the network device sends second configuration information to the terminal device, including: the network device sends the second configuration information to the terminal device through downlink control information (DCI).

That is, on the basis of semi-static configuration of the first configuration information by network device through high-layer signaling, the network device can also flexibly adjust, through DCI, the frequency of searching for PDCCH within a certain period of time in the first time domain resource, that is, the frequency of searching for PDCCH on the second time domain resource.

For example, under the condition that it is not needed to transmit a service with very low delay in the future, the frequency of searching for PDCCH by the terminal device is reduced, thus reducing the power consumption of the terminal device. In this case, the network device may send second configuration information to the terminal device, and the second time domain granularity indicated by the second configuration information may be greater than the first time domain granularity, i.e., the frequency of searching for PDCCH by the terminal device is reduced.

For another example, when the network device needs to transmit a low delay service, it can determine that the frequency of searching for PDCCH by the terminal device needs to be increased to reduce the receiving delay of PDCCH. In this case, the network device may send second configuration information to the terminal device, and the second time domain granularity indicated by the second configuration information may be less than the first time domain granularity, i.e., the frequency of searching for PDCCH by the terminal device is increased.

In other words, the network device can flexibly adjust the region and frequency of searching for PDCCH by the terminal device through DCI on the basis of configuring the region and frequency of searching for PDCCH by the terminal device in a semi-static manner.

Optionally, in the implementation of the present application, the network device may not send configuration information to the terminal device. In this case, the network device may determine a third time domain resource and a third time domain granularity corresponding to the third time domain resource according to predefined third configuration information, and further send PDCCH on part or all of the resources of the third time domain resource by taking the third time domain granularity or a multiple of the third time domain granularity as a cycle.

For a terminal device, the terminal device may determine the third time domain resource and the third time domain granularity corresponding to the third time domain resource according to the predefined third configuration information, and search for PDCCH on the third time domain resource by taking the third time domain granularity as a cycle.

Optionally, the third configuration information may be configuration information stipulated by a protocol, or configuration information defined by a standard, or configuration information that may be regarded as default, that is, the terminal device and the network device can know the third configuration information without signaling interaction.

When the terminal device searches for PDCCH on the third time domain resource by taking the third time domain granularity as a cycle, if the terminal device receives the configuration information sent by the network device, the terminal device determines the corresponding time domain resource and the time domain granularity according to the configuration information sent by the network device, thereby searching for PDCCH. For example, if the terminal device searches for PDCCH on the third time domain resource by taking the third time domain granularity as a cycle, and then receives the first configuration information sent by the network device, the terminal device determines a first time domain resource and a first time domain granularity corresponding to the first time domain resource according to the first configuration information, and searches for PDCCH on the first time domain resource by taking the first time domain granularity as a cycle. The ending position of the third time domain resource may be later than the ending position of the first time domain resource or earlier than the ending position of the first time domain resource. If the ending position of the third time domain resource is later than the ending position of the first time domain resource, the terminal device may search for PDCCH on the third time domain resource in regions other than the first time domain resource according to the third time domain granularity.

In other words, the priority of the configuration information sent by the network device is higher than the priority of the third configuration information. In the condition that the configuration information sent by the network device is not received, PDCCH is searched for according to the third configuration information. In the condition that the configuration information of the network device is received, PDCCH is searched for according to the configuration information sent by the network device preferentially.

Optionally, the third configuration information may be determined according to at least one of a frequency band, a carrier, a system bandwidth, and a numerology.

For example, different frequency bands may correspond to different pieces of third configuration information, or different carriers may correspond to different pieces of third configuration information, or different numerologies may correspond to different pieces of third configuration information, etc.

Hereinafter, a method for signal transmission according to an implementation of the present application will be described with reference to specific examples of FIGS. 3 to 6. In the examples of FIGS. 3 to 6, the first configuration information or the second configuration information includes a time domain length of a time domain resource, a starting position of the time domain resource, and a time domain granularity corresponding to the time domain resource, wherein the starting position of the time domain resource is indicated by a time domain offset relative to a synchronization signal or a broadcast channel, and the time domain granularity corresponding to the time domain resource is in units of a symbol.

It should be understood that the indication manners of the time domain resources in FIGS. 3 to 6 are only taken as examples but not limitations. The position information of the time domain resources can be indicated by other manners as described in the previous implementations. The starting positions of the time domain resources can be described by the time domain offsets relative to the slot boundary or subframe boundary. The time domain granularity can adopt other units as described in the previous implementations, for example, in multiple slots, or multiple micro slots, etc.

As shown in FIG. 3, the first configuration information is sent by the network device to the terminal device through RRC signaling, and the first configuration information includes the following three types of information:

1. The time domain length of the first time domain resource, or referred to as the time domain length of the region containing PDCCH, that is, in which region the PDCCH is to be searched for.

2. The first time domain granularity corresponding to the first time domain resource, or referred to as the time domain granularity of the PDCCH search space in the region including the PDCCH, that is, the time interval or period when the terminal device searches for the PDCCH search space once, that is, at what frequency the PDCCH search space is searched for in the region including the PDCCH.

3. The starting position of the first time domain resource, or the time domain offset of the starting position of the region containing PDCCH relative to the synchronization signal, or the synchronization signal block, or the broadcast channel.

After receiving the first configuration information, according to the first configuration information, the terminal device can determine the starting position of the first time domain resource, that is, the time domain position of the time domain offset relative to the synchronization signal, or synchronization signal block, or broadcast channel, and the corresponding first time domain granularity, that is, N symbols, so that the terminal device can search for PDCCH once every N symbols starting from the starting position of the first time domain resource, or in other words, search for PDCCH by taking N symbols as a cycle. According to the method for signal transmission of the present application, if the network device configures the terminal device to search for PDCCH in any symbol, the network device can further configure the terminal device to search for PDCCH in a certain time domain range (i.e., first time domain resource) with a certain frequency (i.e., first time domain granularity) through the first configuration information, so that the complexity and power consumption of searching for PDCCH by the terminal device can be reduced.

Figure 4:
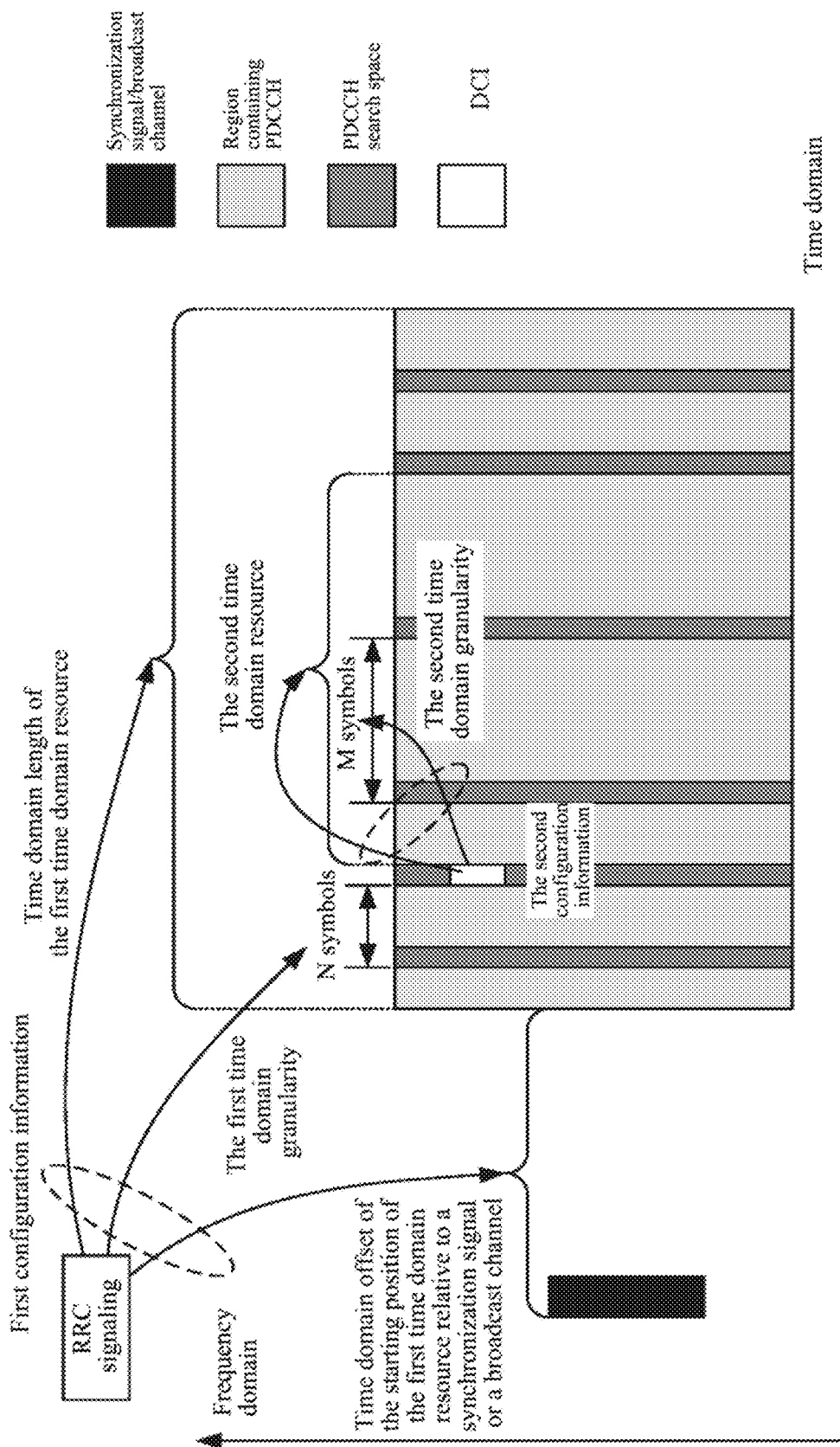
FIG. 4 is a schematic diagram of another example of a method for signal transmission according to an implementation of the present application.
Figure 5:
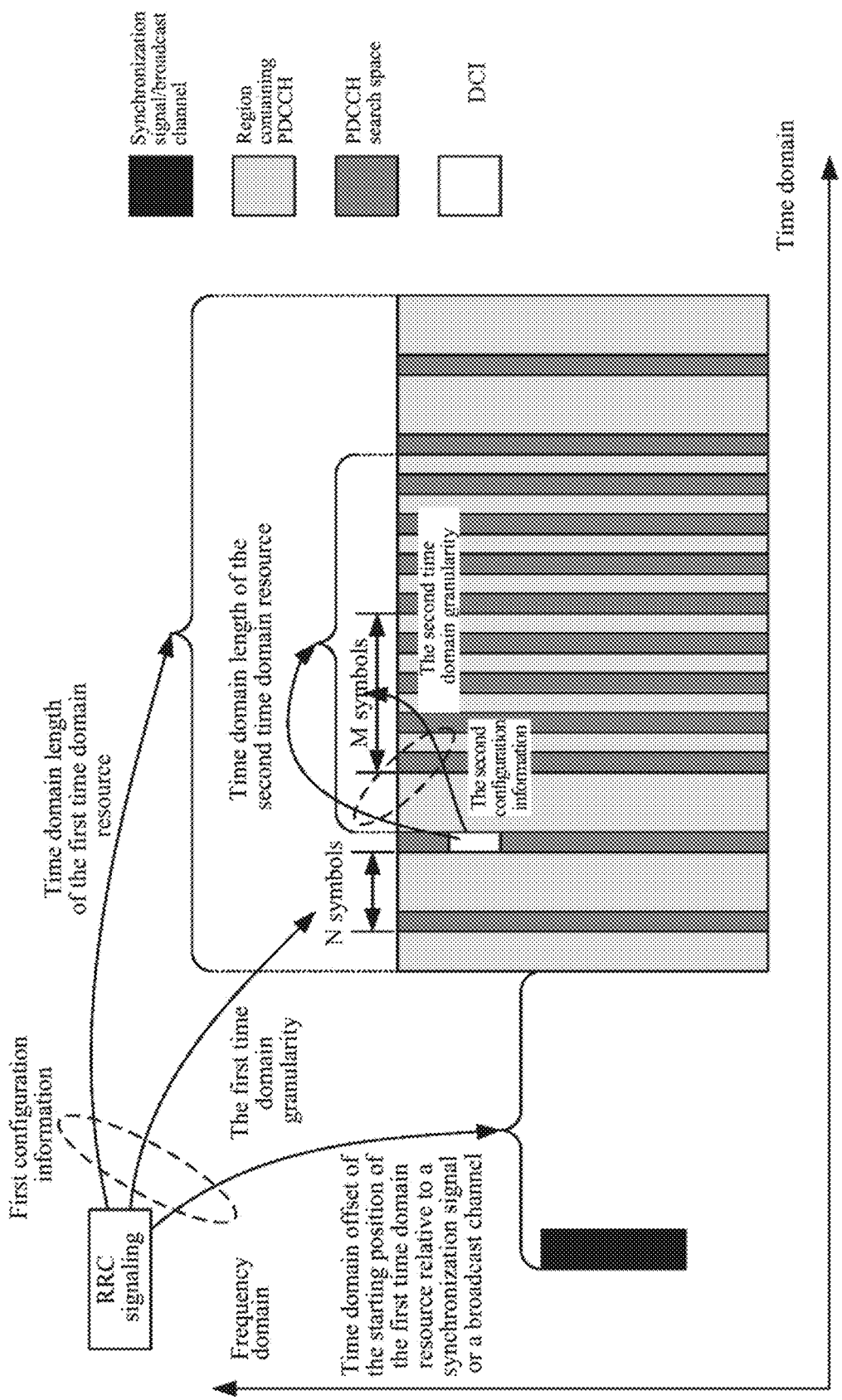
FIG. 5 is a schematic diagram of yet another example of a method for signal transmission according to an implementation of the present application.

In the implementations shown in FIGS. 4 and 5, the terminal device receives second configuration information on the first time domain resource after receiving the first configuration information. The second configuration information is sent by the network device through DCI, and the contents included in the second configuration information can refer to the contents included in the first configuration information in FIG. 3, which will not be repeated here.

It should be noted that in the implementations shown in FIGS. 4 and 5, the position information of the second time domain resource may be indicated by a time domain offset relative to the synchronization signal, or synchronization signal block, or broadcast channel, or it may start from DCI by default, that is, the time when DCI is received is the starting position of the second time domain resource.

After receiving the second configuration information, the terminal device can determine a second time domain resource and a second time domain granularity (M symbols) corresponding to the second time domain resource according to the second configuration information, and search for PDCCH once every M symbols on the second time domain resource.

Since the second time domain resource is a subset of the first time domain resource, the terminal device can still search for PDCCH every N symbols, that is, by using the first time domain granularity, within the first time domain resource excluding the second time domain resource.

The second time domain granularity may be greater than the first time domain granularity. For example, in the implementation shown in FIG. 4, the second time domain granularity is greater than the first time domain granularity, i.e., the frequency at which the terminal device searches for PDCCH on the second time domain resource decreases. For example, when the network device determines that it is not necessary for the terminal device to search for PDCCH with a frequency as high as the first time domain granularity in a future period of time, the network device may reconfigure the frequency of searching for PDCCH by the terminal device through the second configuration information, and reduce the frequency of searching for PDCCH by the terminal device by setting the second time domain granularity in the second configuration information to be greater than the first time domain granularity.

Alternatively, the second time domain granularity may be less than the first time domain granularity. For example, in the implementation shown in FIG. 5, the second time domain granularity is less than the first time domain granularity, i.e., the frequency of searching for PDCCH by the terminal device on the second time domain resource is increased. For example, when the network device determines that in a future period of time, the terminal device is required to search for PDCCH with a frequency higher than the first time domain granularity (e.g., when it is needed to transmit a low delay service), the network device can reconfigure the frequency of searching for PDCCH by the terminal device through the second configuration information, and improve the frequency of searching for PDCCH by the terminal device by setting the second time domain granularity in the second configuration information to be less than the first time domain granularity. In other words, the network device can temporarily increase the frequency of searching for PDCCH through DCI to more effectively support low delay services.

Figure 6:
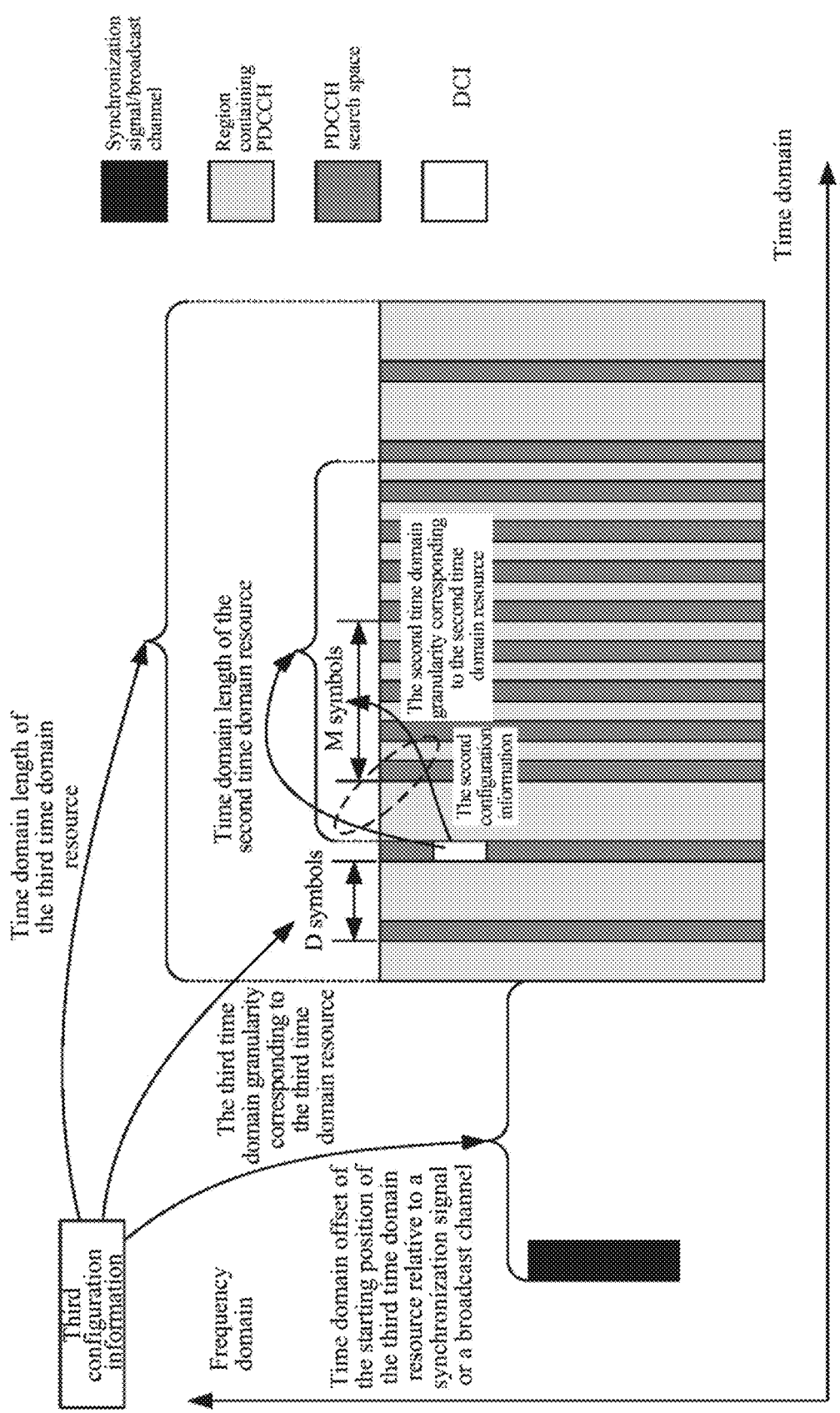
FIG. 6 is a schematic diagram of yet another example of a method for signal transmission according to an implementation of the present application.

In the implementation shown in FIG. 6, in the condition that the terminal device does not receive the configuration information sent by the network device, the terminal device determines the third time domain resource and the third time domain granularity (D symbols) corresponding to the third time domain resource according to the default or predefined third configuration information, and the contents included in the third configuration information can refer to the contents included in the first configuration information in FIG. 3, which will not be described here again.

When the terminal device searches for the PDCCH once every D symbols on the third time domain resource, the terminal device receives the second configuration information sent by the network device. In this case, the terminal device determines the second time domain resource and the second time domain granularity (M symbols) corresponding to the second time domain resource according to the second configuration information, thereby searching for the PDCCH once every M symbols on the second time domain resource.

The ending position of the third time domain resource may be later than the ending position of the second time domain resource or earlier than the ending position of the second time domain resource. If the ending position of the third time domain resource is later than the ending position of the second time domain resource, the terminal device may search for PDCCH in regions other than the second time domain resource on the third time domain resource according to the third time domain granularity. That is, in the third time domain resource excluding the second time domain resource, the terminal device can still search for PDCCH once every D symbols.

Alternatively, the second time domain granularity may be greater than the third time domain granularity or less than the third time domain granularity. FIG. 6 is described by taking the second time domain granularity less than the third time domain granularity as an example only and should not constitute any limitation to the application.

The method for signal transmission according to implementations of the present application is described in detail from the perspective of a network device above in combination with FIGS. 2 to 6, and a method for signal transmission according to an implementation of the present application is described in detail from the perspective of a terminal device below in combination with FIG. 7. It should be understood that the description on the network device side corresponds to the description on the terminal device side, and the contents in the above may be referred to for similar descriptions, which will not be repeated here to avoid repetition.

Figure 7:
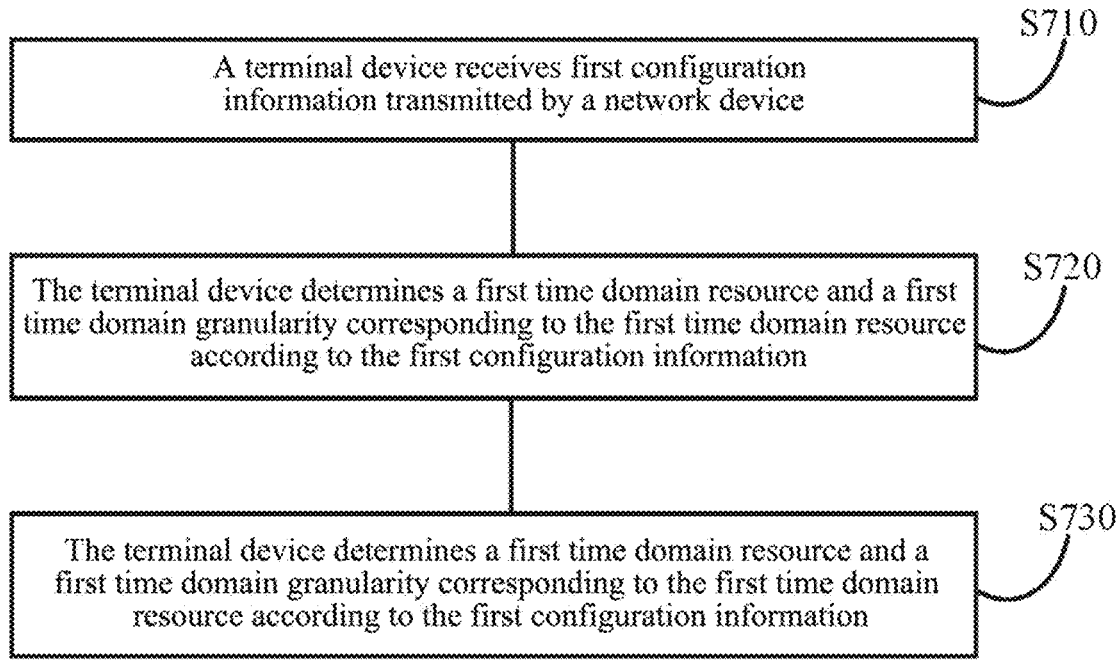
FIG. 7 is a schematic flow chart of a method for signal transmission according to another implementation of the present application.

FIG. 7 is a schematic flow chart of a method for signal transmission according to another implementation of the present application. As shown in FIG. 7, the method 700 includes the following acts.

In S710, a terminal device receives first configuration information transmitted by a network device.

In S720, the terminal device determines a first time domain resource and a first time domain granularity corresponding to the first time domain resource according to the first configuration information.

In S730, the terminal device searches for a downlink control channel on the first time domain resource by taking the first time domain granularity as a cycle.

Optionally, in some implementations, the terminal device receives the first configuration information transmitted by the network device, including: receiving, by the terminal device, the first configuration information transmitted by the network device through high-layer signaling.

Optionally, in some implementations, the method further includes: the terminal device receives the second configuration information transmitted by the network device; the terminal device determines a second time domain resource in the first time domain resource and a second time domain granularity corresponding to the second time domain resource according to the second configuration information; the terminal device searches for a downlink control channel on the second time domain resource by taking the second time domain granularity as a cycle.

Optionally, in some implementations, the terminal device receives the second configuration information transmitted by the network device, including: the terminal device receives the second configuration information transmitted by the network device through downlink control information (DCI).

Optionally, in some implementations, the method further includes: if the terminal device does not receive the configuration information sent by the network device, the terminal device determines a third time domain resource and a third time domain granularity corresponding to the third time domain resource according to predefined third configuration information; the terminal device searches for a downlink control channel on the third time domain resource by taking the third time domain granularity as a cycle.

Optionally, in some implementations, the third configuration information is determined according to at least one of: a frequency band, a carrier, a system bandwidth and a numerology.

Optionally, in some implementations, the first time domain resource is indicated by at least one of: the starting position, the ending position and the time domain length of the first time domain resource.

Optionally, in some implementations, the starting position or ending position of the first time domain resource is indicated by one of the following: the time domain offset relative to the time domain position of the synchronization signal or broadcast channel, or the slot boundary, or subframe boundary.

Optionally, in some implementations, the time domain offset is in units of at least one symbol, or a preset quantity of symbols, or a slot, or a micro-slot.

Optionally, in some implementations, the first time domain granularity is in units of at least one symbol, or a preset quantity of symbols, or a slot, or a micro-slot.

Method implementations of the present application are described in detail above with reference to FIGS. 2 to 7, apparatus implementations of the present application are described in detail below with reference to FIGS. 8 to 11. It should be understood that the apparatus implementations and the method implementations correspond to each other, and description of the method implementations may be referred to for similar description of the apparatus implementations.

Figure 8:
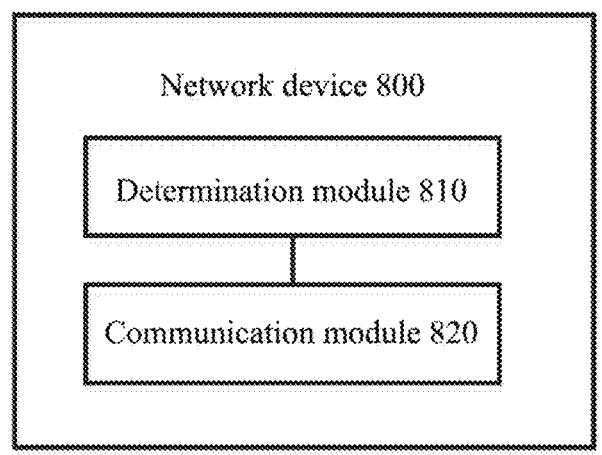
FIG. 8 is a schematic block diagram of a network device according to an implementation of the present application.

FIG. 8 is a schematic block diagram of a network device according to an implementation of the present application. As shown in FIG. 8, the network device 800 includes a determination module 810 and a communication module 820.

The determination module 810 is used for determining first configuration information, wherein the first configuration information is used for indicating a first time domain resource and a first time domain granularity corresponding to the first time domain resource, and the first time domain resource and the first time domain granularity are used for a terminal device to search for a downlink control channel on the first time domain resource by taking the first time domain granularity as a cycle.

The communication module 820 is used for transmitting the first configuration information to the terminal device.

Optionally, in some implementations, the communication module 820 is specifically used for: transmitting the first configuration information to the terminal device through high-layer signaling.

Optionally, in some implementations, the communication module 820 is further used for: transmitting second configuration information to the terminal device, wherein the second configuration information is used for indicating a second time domain resource in the first time domain resource and a second time domain granularity corresponding to the second time domain resource, and the second time domain resource and the second time domain granularity are used for the terminal device to search for the downlink control channel on the second time domain resource by taking the second time domain granularity as a cycle.

Optionally, in some implementations, the communication module 820 is specifically used for: transmitting the second configuration information to the terminal device through downlink control information (DCI).

Optionally, in some implementations, the first configuration information includes at least one of a starting position, an ending position, and a time domain length of the first time domain resource.

Optionally, in some implementations, the starting position or ending position of the first time domain resource is indicated by one of the following: the time domain offset relative to the time domain position of the synchronization signal or broadcast channel, or the slot boundary, or subframe boundary.

Optionally, in some implementations, the time domain offset is in units of at least one symbol, or a preset quantity of symbols, or slots, or micro-slots.

Optionally, in some implementations, the first time domain granularity is in units of at least one symbol, or a preset quantity of symbols, or a slot, or a micro-slot.

Optionally, in some implementations, the determination module 810 is further used for: determining the third time domain resource and a third time domain granularity corresponding to the third time domain resource according to predefined third configuration information.

The communication module 820 is further used for: transmitting the downlink control channel according to the third time domain resource and the third time domain granularity.

Optionally, in some implementations, the third configuration information is determined according to at least one of: a frequency band, a carrier, a system bandwidth and a numerology.

Specifically, the network device 800 may correspond to (e.g., may be configured in or be itself) the network device described in the method 200, and various modules or units in the device 800 are respectively used for executing various actions or processes performed by the network device in the method 200. Herein, in order to avoid redundancy, detailed description thereof is omitted.

Figure 9:
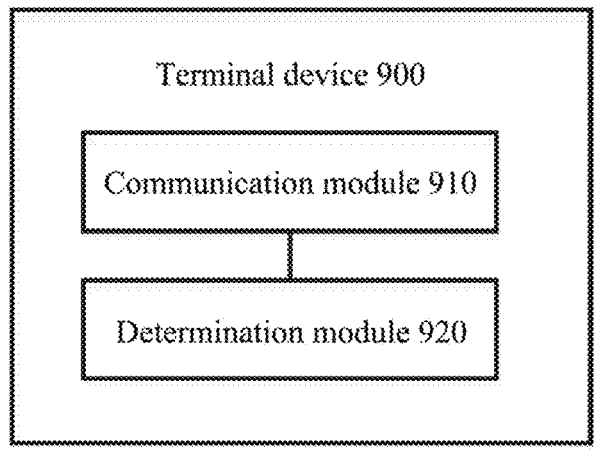
FIG. 9 is a schematic block diagram of a terminal device according to an implementation of the present application.

FIG. 9 is a schematic block diagram of a terminal device according to an implementation of the present application. As shown in FIG. 9, the terminal device 900 includes a communication module 910 and a determination module 920.

The communication module 910 is used for receiving first information transmitted by a network device.

The determination module 920 is used for determining a first time domain resource and a first time domain granularity corresponding to the first time domain resource according to the first configuration information.

The communication module 910 is further used for searching for a downlink control channel on the first time domain resource by taking the first time domain granularity as a cycle.

Optionally, in some implementations, the communication module 910 is specifically used for: receiving the first configuration information transmitted by the network device through high-layer signaling.

Optionally, in some implementations, the communication module 910 is further used for: receiving second configuration information transmitted by the network device.

The determination module 920 is further used for: determining a second time domain resource in the first time domain resource and a second time domain granularity corresponding to the second time domain resource according to the second configuration information.

The communication module 910 is further used for: searching for a downlink control channel on the second time domain resource by taking the second time domain granularity as a cycle.

Optionally, in some implementations, the communication module 910 is further used for: receiving the second configuration information transmitted by the network device through downlink control information (DCI).

Optionally, in some implementations, the determination module 920 is further used for: if the terminal device does not receive the configuration information transmitted by the network device, determining a third time domain resource and a third time domain granularity corresponding to the third time domain resource according to the predefined third configuration information.

The communication module 910 is further used for: searching for a downlink control channel on the third time domain resource by taking the third time domain granularity as a cycle.

Optionally, in some implementations, the third configuration information is determined according to at least one of: a frequency band, a carrier, a system bandwidth and a numerology.

Optionally, in some implementations, the first time domain resource is indicated by at least one of: the starting position, the ending position and the time domain length of the first time domain resource.

Optionally, in some implementations, the starting position or ending position of the first time domain resource is indicated by one of the following: the time domain offset relative to the time domain position of the synchronization signal or broadcast channel, or the slot boundary, or subframe boundary.

Optionally, in some implementations, the time domain offset is in units of at least one symbol, or a preset quantity of symbols, or a slot, or a micro-slot.

Optionally, in some implementations, the first time domain granularity is in units of at least one symbol, or a preset quantity of symbols, or a slot, or a micro-slot.

Specifically, the terminal device 900 may correspond to (e.g., may be configured in or be itself) the terminal device described in the method 700, and various modules or units in the terminal device 900 are respectively used for executing various actions or processes performed by the network device in the method 700. Herein, in order to avoid redundancy, detailed description thereof is omitted.

Figure 10:
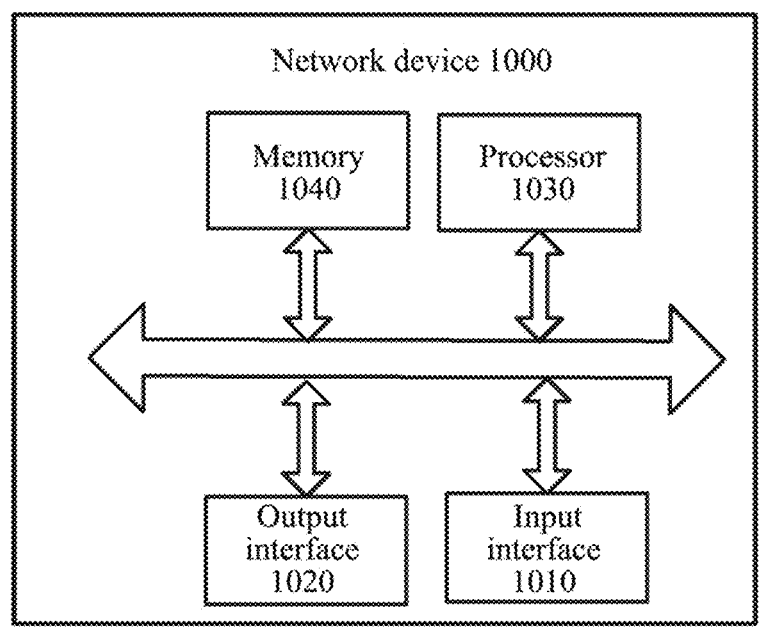
FIG. 10 is a schematic block diagram of a network device according to another implementation of the present application.

As shown in FIG. 10, an implementation of the present application also provides a network device 1000, which may be the network device 800 in FIG. 8, and may be used for executing the contents of the network device 200 corresponding to the method 200 in FIG. 2. The device 1000 includes an input interface 1010, an output interface 1020, a processor 1030, and a memory 1040. The input interface 1010, the output interface 1020, the processor 1030, and the memory 1040 may be connected through a bus system. The memory 1040 is used for storing programs, instructions, or codes. The processor 1030 is used for executing programs, instructions, or codes in the memory 1040 to control the input interface 1010 to receive signals, to control the output interface 1020 to send signals, and to complete the operations in the foregoing method implementations.

It should be understood that in the implementations of the present application, the processor 1030 may be a Central Processing Unit (CPU), or the processor 1030 may be other general processor, digital signal processor (DSP), application specific integrated circuits (ASIC), field programmable gate arrays (FPGA) or other programmable logic device, discrete gate or transistor logic device, discrete hardware components, etc. The general processor may be a microprocessor, or the processor may be any conventional processor or the like.

The memory 1040 may include the read only memory and random access memory, and provide instructions and data to the processor 1030. A portion of memory 1040 may include non-volatile random access memory. For example, the memory 1040 may also store information of device type.

In implementation processes, various contents of the methods described above may be accomplished by integrated logic circuits of hardware or instructions in the form of software in the processor 1030. The contents of the method disclosed in connection with the implementations of the present application may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 1040, and the processor 1030 reads information in the memory 1040 and completes the contents of the above method in combination with its hardware. In order to avoid repetition, it will not be described in detail here.

In a specific implementation, the determination module 810 included in the network device 800 in FIG. 8 may be implemented by the processor 1030 in FIG. 10, and the communication module 820 included in the device 800 may be implemented by the input interface 1010 and the output interface 1020 in FIG. 10.

Figure 11:
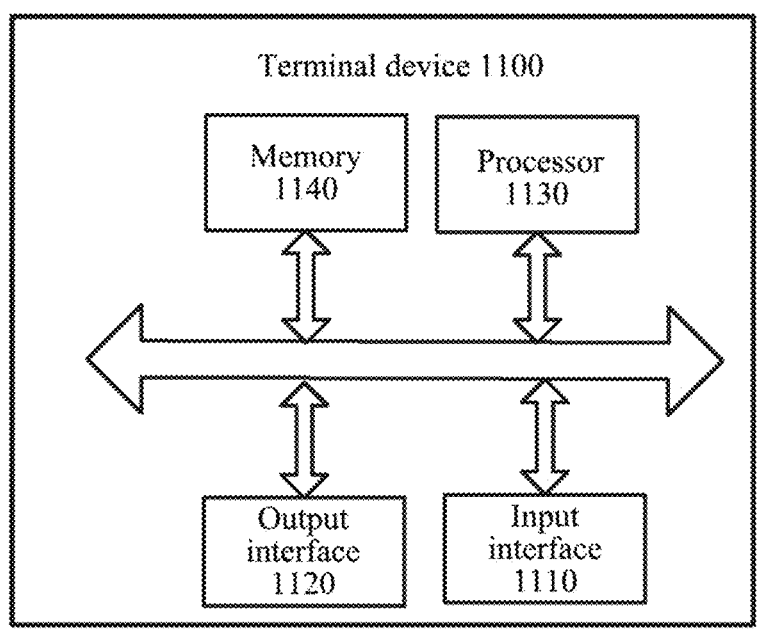
FIG. 11 is a schematic block diagram of a terminal device according to another implementation of the present application.

As shown in FIG. 11, an implementation of the present application further provides a terminal device 1100, which may be the terminal device 900 in FIG. 9 and may be used for executing the contents of the terminal device corresponding to the method 700 in FIG. 7. The terminal device 1100 includes an input interface 1110, an output interface 1120, a processor 1130, and a memory 1140. The input interface 1110, the output interface 1120, the processor 1130, and the memory 1140 may be connected through a bus system. The memory 1140 is used for storing programs, instructions, or codes. The processor 1130 is used for executing programs, instructions, or codes in the memory 1140 to control the input interface 1110 to receive signals, to control the output interface 1120 to send signals, and to complete the operations in the foregoing method implementations.

It should be understood that in the implementations of the present application, the processor 1130 may be a Central Processing Unit (CPU), or the processor 1130 may be other general processor, digital signal processor (DSP), application specific integrated circuits (ASIC), field programmable gate arrays (FPGA) or other programmable logic device, discrete gate or transistor logic device, discrete hardware components, etc. The general processor may be a microprocessor, or the processor may be any conventional processor or the like.

The memory 1140 may include the read only memory and random access memory, and provide instructions and data to the processor 1130. A portion of memory 1140 may include non-volatile random access memory. For example, the memory 1140 may also store information of device type.

In implementation processes, various contents of the methods described above may be accomplished by integrated logic circuits of hardware or instructions in the form of software in the processor 1130. The contents of the method disclosed in connection with the implementations of the present application may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 1140, and the processor 1130 reads information in the memory 1140 and completes the contents of the above method in combination with its hardware. In order to avoid repetition, it will not be described in detail here.

In a specific implementation, the determination module 920 included in the device 900 in FIG. 9 may be implemented by the processor 1130 in FIG. 11, and the communication module 910 included in the terminal device 900 may be implemented by the input interface 1110 and the output interface 1120 in FIG. 11.

Implementations of the present application also provide a computer readable storage medium that stores one or more programs including instructions that, when executed by a portable electronic device including a plurality of application programs, enable the portable electronic device to perform the method of the implementations shown in FIG. 2 or 7.

Implementations of the present application also provide a computer program, which includes instructions that, when executed by a computer, enable the computer to execute the corresponding process of the method of the implementations shown in FIGS. 2 and 7.

Those of ordinary skill in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different methods to realize the described functions for each particular application, but such realization should not be considered to be beyond the scope of the present application.

Those skilled in the art may clearly understand that for convenience and conciseness of description, the specific working process of the system, apparatus and unit described above may refer to the corresponding process in the aforementioned implementations of methods, and details are not described herein again.

In several implementations provided by the present application, it should be understood that the disclosed systems, apparatuses and methods may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and the component shown as a unit may or may not be a physical unit, i.e., it may be located in one place or may be distributed over multiple network units. Some or all of the units may be selected according to practical needs to achieve a purpose of the solution of the implementations.

In addition, various functional units in various implementations of the present application may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device) to perform all or part of the acts of the method described in various implementations of the present application. The aforementioned storage media include U disk, mobile hard disk, read-only memory (ROM), random access memory (RAM), magnetic disk or optical disk, and other media capable of storing program codes.

The foregoing are merely exemplary implementations of the present application, but the protection scope of the present application is not limited thereto. Any person skilled in the art may easily conceive variations or substitutions within the technical scope disclosed by the present application, which should be included within the protection scope of the present application. Therefore, the protection scope of the present application should be subject to the protection scope of the claims.

What is claimed is:

1. A method for signal transmission, comprising:
   receiving, by a terminal device, first configuration information transmitted by a network device;
   determining, by the terminal device, a first time domain resource and a first time domain granularity corresponding to the first time domain resource according to the first configuration information; and
   searching, by the terminal device, for a downlink control channel on the first time domain resource by taking the first time domain granularity as a cycle;
   wherein the method further comprises:
   upon determining that the terminal device does not receive the configuration information transmitted by the network device, determining, by the terminal device, a third time domain resource and a third time domain granularity corresponding to the third time domain resource according to predefined third configuration information; and searching, by the terminal device, for the downlink control channel on the third time domain resource by taking the third time domain granularity as a cycle, wherein the third configuration information is determined according to at least one of:
- a frequency band,
- a carrier,
- a system bandwidth, or
- a numerology.

2. The method according to claim 1, wherein receiving, by the terminal device, the first configuration information transmitted by the network device comprises:
receiving, by the terminal device, the first configuration information transmitted by the network device through high-layer signaling.

3. The method according to claim 2, wherein the method further comprises:
receiving, by the terminal device, second configuration information sent by the network device;
determining, by the terminal device, a second time domain resource in the first time domain resource and a second time domain granularity corresponding to the second time domain resource according to the second configuration information; and
searching, by the terminal device, for the downlink control channel on the second time domain resource by taking the second time domain granularity as a cycle.

4. The method according to claim 3, wherein receiving, by the terminal device, the second configuration information transmitted by the network device comprises:
receiving, by the terminal device, the second configuration information transmitted by the network device through downlink control information (DCI).

5. The method according to claim 1, wherein the first time domain resource is indicated by at least one of the following:
a starting position, an ending position, and a time domain length of the first time domain resource.

6. The method according to claim 5, wherein the starting position or ending position of the first time domain resource is indicated by one of the following:
a time domain offset relative to a time domain position of a synchronization signal or broadcast channel, or a slot boundary, or a subframe boundary,
wherein the time domain offset is in units of at least one symbol, or a preset quantity of symbols, or a slot, or a micro-slot.

7. The method according to claim 1, wherein the first time domain granularity is in units of at least one symbol, or a preset quantity of symbols, or a slot, or a micro-slot.

8. A network device, comprising:
a processor, used for determining first configuration information, wherein the first configuration information is used for indicating a first time domain resource and a first time domain granularity corresponding to the first time domain resource, wherein the first time domain resource and the first time domain granularity are used for a terminal device to search for a downlink control channel on the first time domain resource by taking the first time domain granularity as a cycle; and
a transceiver, used for transmitting the first configuration information to the terminal device,
wherein the processor is further used for determining a third time domain resource and a third time domain granularity corresponding to the third time domain resource according to predefined third configuration information, and wherein the transceiver is further used for transmitting the downlink control channel according to the third time domain resource and the third time domain granularity.

9. The network device according to claim 8, wherein the transceiver is further used for:
sending second configuration information to the terminal device, wherein the second configuration information is used for indicating a second time domain resource in the first time domain resource and a second time domain granularity corresponding to the second time domain resource, wherein the second time domain resource and the second time domain granularity are used for the terminal device to search for the downlink control channel on the second time domain resource by taking the second time domain granularity as a cycle.

10. The network device according to claim 8, wherein the first configuration information comprises at least one of a starting position, an ending position, and a time domain length of the first time domain resource.

11. A terminal device, comprising:
a transceiver, used for receiving first configuration information transmitted by a network device; and
a processor, used for determining a first time domain resource and a first time domain granularity corresponding to the first time domain resource according to the first configuration information;
wherein the transceiver is further used for searching for a downlink control channel on the first time domain resource by taking the first time domain granularity as a cycle,
wherein the processor is further used for, upon determining that the terminal device does not receive the configuration information transmitted by the network device, determining a third time domain resource and a third time domain granularity corresponding to the third time domain resource according to predefined third configuration information,
wherein the transceiver is further used for searching for the downlink control channel on the third time domain resource by taking the third time domain granularity as a cycle, and
wherein the third configuration information is determined according to at least one of the following: a frequency band, a carrier, a system bandwidth, or a numerology.

12. The terminal device according to claim 11, wherein the transceiver is specifically used for:
receiving the first configuration information transmitted by the network device through high-layer signaling.

13. The terminal device according to claim 12, wherein the transceiver is further used for:
receiving second configuration information transmitted by the network device;
the processor is further used for:
determining a second time domain resource in the first time domain resource and a second time domain granularity corresponding to the second time domain resource according to the second configuration information;
the transceiver is further used for:
searching for the downlink control channel on the second time domain resource by taking the second time domain granularity as a cycle.

14. The terminal device according to claim 13, wherein the transceiver is further used for:
receiving the second configuration information transmitted by the network device through downlink control information (DCI).

15. The terminal device according to claim 11, wherein the first time domain resource is indicated by at least one of:
   a starting position, an ending position, and a time domain length of the first time domain resource.

16. The terminal device according to claim 11, wherein the starting position or ending position of the first time domain resource is indicated by one of the following:
   a time domain offset relative to a time domain position of a synchronization signal or broadcast channel, or a slot boundary, or a subframe boundary,
   wherein the time domain offset is in units of at least one symbol, or a preset quantity of symbols, or a slot, or a micro-slot.

17. The terminal device according to claim 11, wherein the first time domain granularity is in units of at least one symbol, or a preset quantity of symbols, or a slot, or a micro-slot.

\* \* \* \* \*